US008210703B2

(12) United States Patent
Wu

(10) Patent No.: US 8,210,703 B2
(45) Date of Patent: Jul. 3, 2012

(54) HEADLAMP THAT MAY BE DISMANTLED

(76) Inventor: Jian-Jun Wu, Zhejiang (CN)

( * ) Notice: Subject to any disclaimer, the term of this patent is extended or adjusted under 35 U.S.C. 154(b) by 0 days.

(21) Appl. No.: 11/966,966

(22) Filed: Dec. 28, 2007

(65) Prior Publication Data

US 2009/0009986 A1 Jan. 8, 2009

(30) Foreign Application Priority Data

Jun. 28, 2007 (CN) .......................... 2007 1 0023959

(51) Int. Cl.
*F21V 21/084* (2006.01)
*F21L 4/00* (2006.01)
*F21L 13/00* (2006.01)
*H04M 1/22* (2006.01)
*B60Q 1/26* (2006.01)

(52) U.S. Cl. .......................... 362/105; 362/191; 362/192

(58) Field of Classification Search .................... 362/20, 362/183, 200–208, 382, 427, 430, 397, 298, 362/105, 190–193; 224/576, 181, 930
See application file for complete search history.

(56) References Cited

U.S. PATENT DOCUMENTS 6,618,906 B2 * 9/2003 Ciesiun .......................... 24/3.12
6,736,529 B1 * 5/2004 Lee .............................. 362/287
6,959,999 B2 * 11/2005 Lee .............................. 362/192
7,434,969 B2 * 10/2008 Ford et al. ..................... 362/382
7,497,585 B2 * 3/2009 Yu ................................ 362/105

* cited by examiner

*Primary Examiner* — David Crowe

(57) ABSTRACT

The headlamp comprises a fixture with a head strap, and a floodlight. The floodlight comprises a lamp body and a lamp receptacle, being characterized in that the head body and lamp receptacle of the floodlight is an integrally formed unit. The fixture mount may be removed from the floodlight such that the floodlight is used an ordinary flashlight, independent of the fixture mount.

5 Claims, 5 Drawing Sheets

HEADLAMP THAT MAY BE DISMANTLED

BACKGROUND OF THE INVENTION

1. Field of the Invention

This invention relates to an illuminating tool and particularly to a headlamp worn on a human head and is easily disassembled.

2. Description of Related Art

A floodlight is popularly used in daily life. Thus, features of high illumination, being durable, and light in weight are required when in use. Along with the development in technology, the existing products in the market are continuously improved both in appearance and in inner structure, and are manufactured for a variety of models. However, the product's shape and degrees of comfort is in general overlooked; for example, most of the floodlights are carried by one hand and thus are limited in applications in some occasions.

An example of a headlamp is structured with a lamp body, a head wrap, and a lamp receptacle and designed for the lamp body of which two sides are formed straps for a human head. The lamp receptacle is connected to the lamp body through a rotation part, and freely revolves through a revolving handle grip. The headlamp has some defects: 1. disposition of the head receptacle is separated from the lamp body and as such, a lead wire is used to connect the above-mentioned two parts, with the lead wire exposed outside and thus is easily worn out in time; 2. fixing of the lamp receptacle to the head strap, which constrains the applications in different occasions; 3. time-imminent battery charging or dry battery replacement being required, when the power runs out, The present invention is developed to avoid the defects described above.

SUMMARY OF THE INVENTION

In this invention, a floodlight is disclosed that is easily removed from head during its application in use.

To achieve the object, the headlamp comprises a fixture with a head strap, and a floodlight. The floodlight comprises a lamp body and a lamp receptacle, being characterized in that the head body and lamp receptacle of the floodlight is an all-in-one unit and the floodlight and the fixture mount are easily disassembled from each other. In the manner described above, the floodlight is removable from the fixture mount to serve independently as an ordinary flashlight itself for a different application of the headlamp.

A mounting plate is connected with a turning joint to the fixture mount, and the floodlight capable of being disassembled is then inserted onto the mounting plate. The turning joint is on the fixture mount in a shape including a vertical portion and a horizontal portion. A guidance groove is formed at each of both sides of bottom lateral-side of the mounting plate. A lead rail is formed on the lamp body of the corresponding floodlight to correspond to the both sides of bottom lateral-side. A shift limit lug is provided at a bottom lateral-side of the mounting plate. A shift limit hole is positioned to correspond to the lamp body. The floodlight that is thereby mounted onto the mounting plate is much more firmly positioned, on a head. Indeed, in this invention, the mounting plate may also be provided in another form, and once it is arranged in another form, the lamp body corresponding to the floodlight is differently connected. If the mounting plate is arranged in a U shape, the mounting plate clips the floodlight.

A power generator, a rechargeable battery, and a gear transmission unit are provided in the lamp body of floodlight. The gear transmission unit is connected to a dynamo driving gear of the power generator. An output terminal of the power generator is connected to the rechargeable battery. A rocking handle that drives the gear transmission unit is provided on a housing of the lamp body. The rocking handle is provided at an bottom lateral-side of the housing of lamp body. A shaft of the rocking handle is arranged near the lamp receptacle of the housing. A receiving hole for a handle portion of the rocking handle is formed near the bottom lateral-side of housing, and when the rocking handle is not used, the handle portion of rocking handle is received in the receiving hole. Thus, an electric power of the floodlight is generated in situations of lacking battery or AC power supply.

Grooves are provided at the two sides of the handle portion of the rocking handle and at both sides the bottom lateral-side of the mounting plate. The shift limit lug of which a cross section is in a T shape is provided at the bottom lateral-side of the mounting plate, and the shift limit hole wedged to correspond to the shift limit lug is provided on the rocking handle to prevent the floodlight from falling transversally. The shift limit hole comprises a center hole and an adjacent member. The center hole is divided into a big-aperture part and a small-aperture part, the inner side of big-aperture part communicates that of the small-aperture part through their corresponding curved faces. The adjacent member is formed outside of the two curved faces. The shift limit lug is placed into the big-aperture part of the center hole and glides to the small-aperture part for a transversally and longitudinally fixing with the shift limit hole Alternatively, the shift limit hole is simply a hole, manufactured with a material of sufficient flexibility.

Two insertion bars are correspondingly provided at the side of mounting plate. A distance between the two insertion bars is equal to a width of the handle portion of rocking handle. An insertion slot is formed in the accommodation hole for the handle portion of rocking handle near the bottom lateral-side of the housing of the lamp body. The insertion bar mates with the insertion slot for a further clamping of the lamp body into the mounting plate. In the embodiment of this invention, an insertion bar is necessarily required e; alternatively, the insertion bar may be arranged on the lamp body of floodlight and the insertion slot may be arranged on the mounting plate.

Two supports are provided on the fixture. The mounting plate fixes with the fixture through the support with a turning joint. A button is provided at a top of the housing to control the lamp receptacle, and to manually to turn on the floodlight, and the floodlight is well secured. The support on the fixture may also be tightly compressed to revolve around the mounting plate to fix with each other, to assure the floodlight is secured after being turned round. A protruding stand is provided at an angular portion of the mounting plate in a shape including a vertical portion and a horizontal portion at a side of the shift limit lug; through the protruding stand, internal parts are more tightly coupled with each other after the floodlight is inserted into the fixture.

In the description mentioned above, only the detailed description and drawings of the embodiments of this invention are provided without limiting to this invention and the characteristics of this invention.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
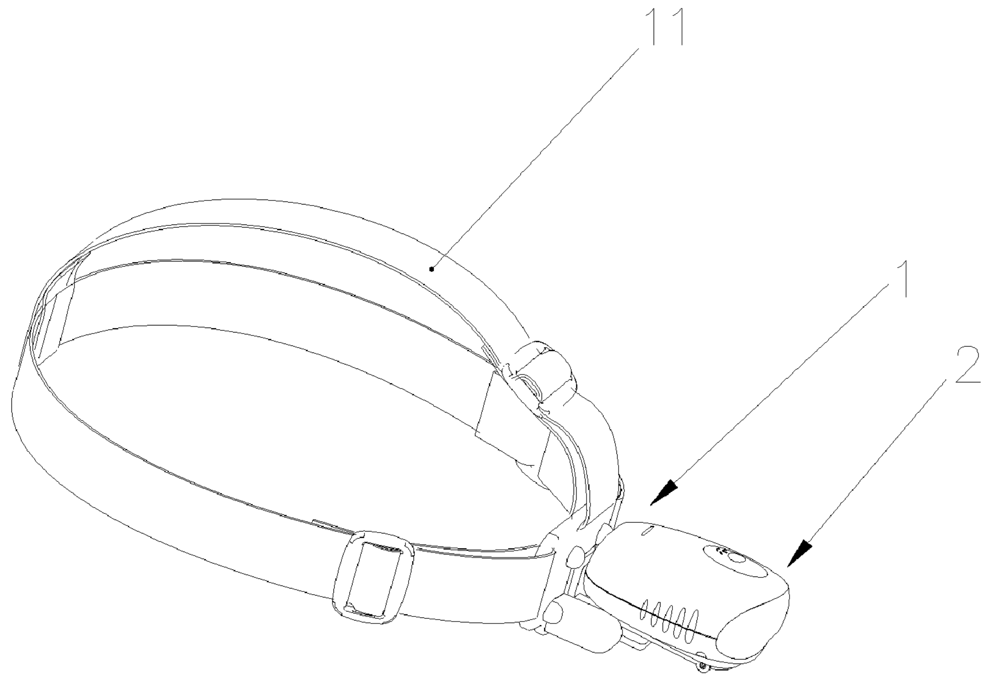
FIG. 1 is a schematic view illustrating a service status in an embodiment of this invention.
Figure 2:
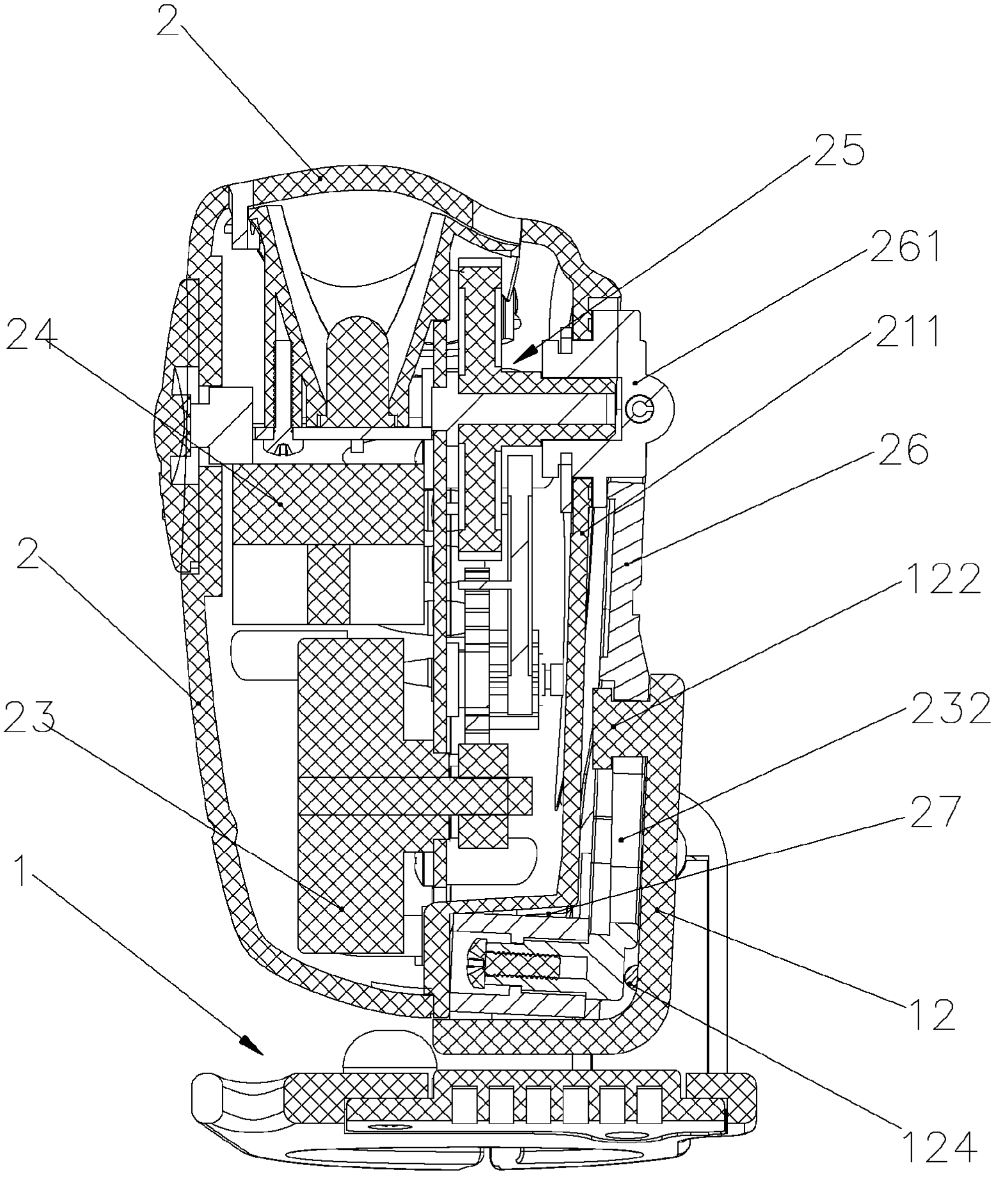
FIG. 2 is a schematic view illustrating a structure in the embodiment of this invention.
Figure 3:
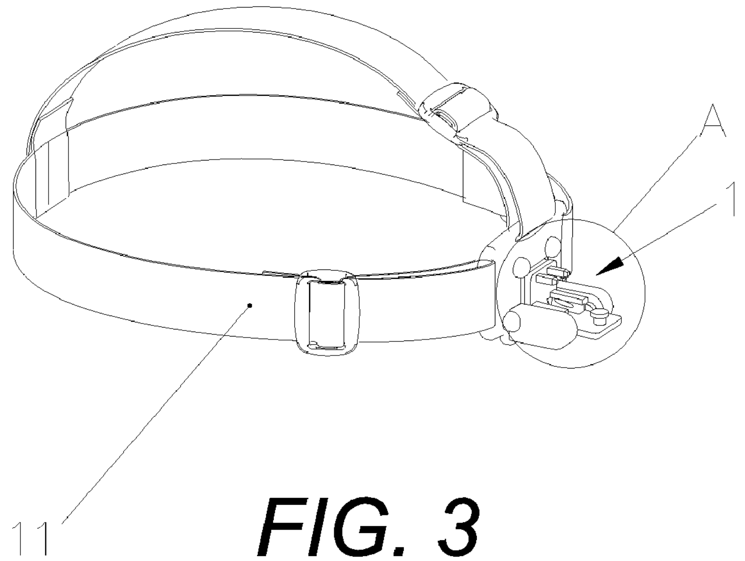
FIG. 3 is a schematic view illustrating a structure of a fixture in the embodiment of this invention.
Figure 4:
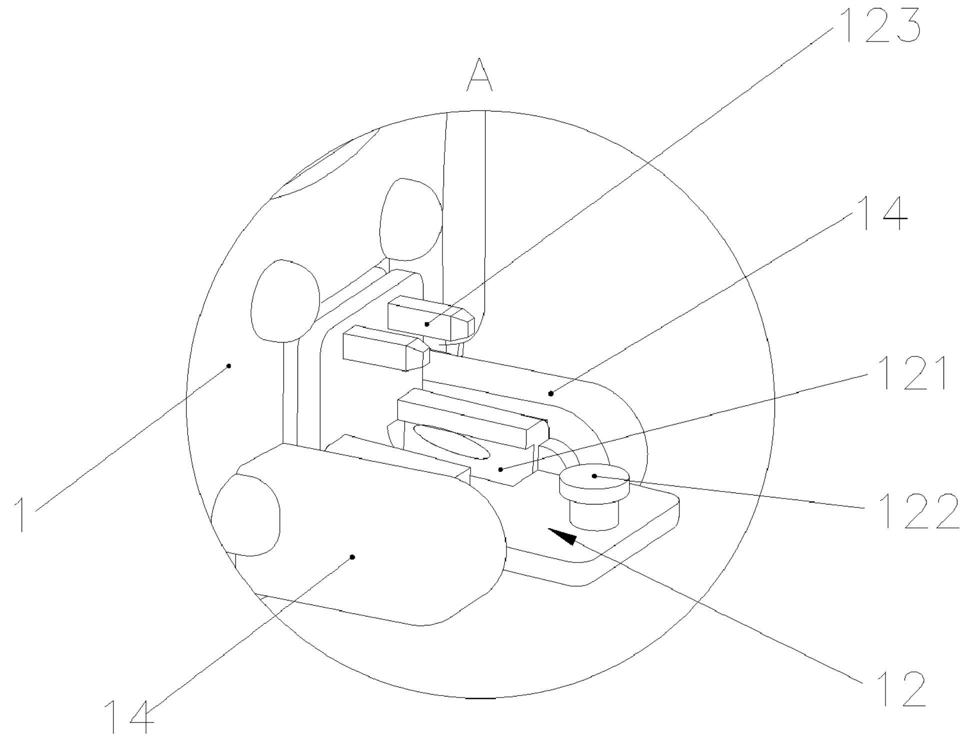
FIG. 4 is an enlarged view of portion A of FIG. 2.
Figure 5:
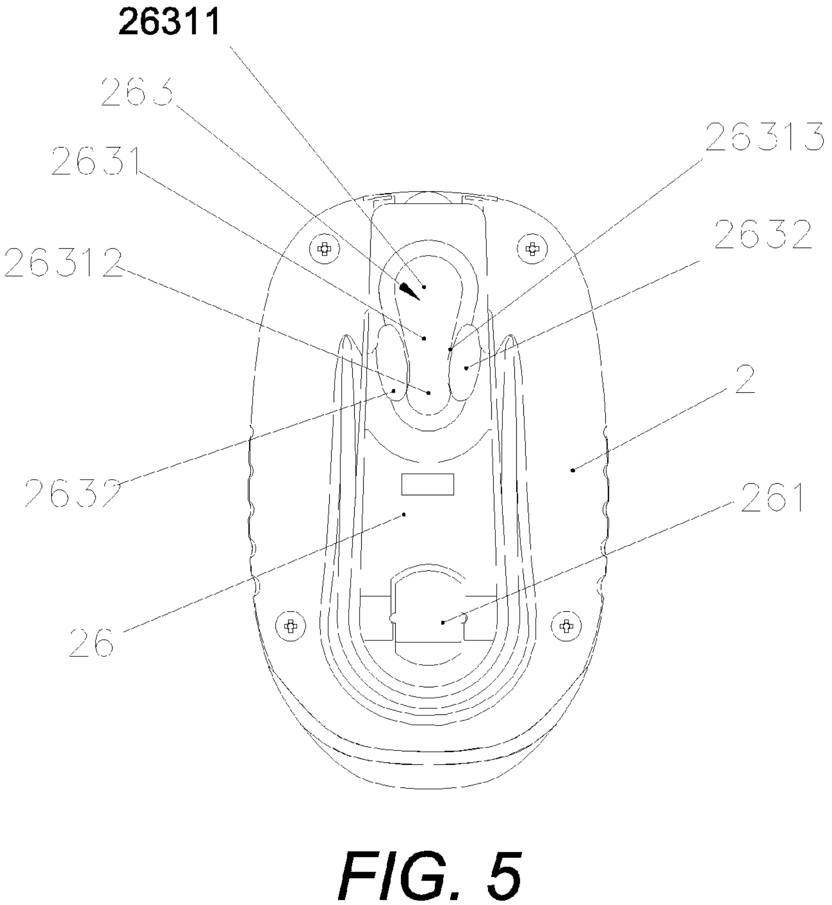
FIG. 5 is a first schematic view illustrating a structure of a floodlight in the embodiment of this invention.
Figure 6:
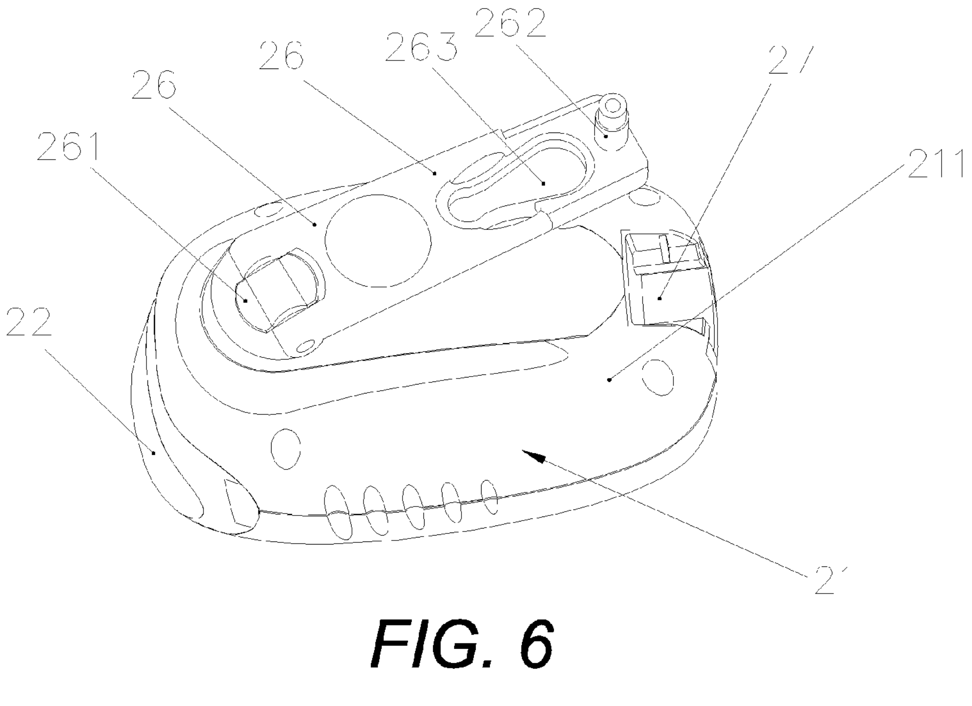
FIG. 6 is a second schematic view illustrating the structure of floodlight in the embodiment of this invention.
Figure 7:
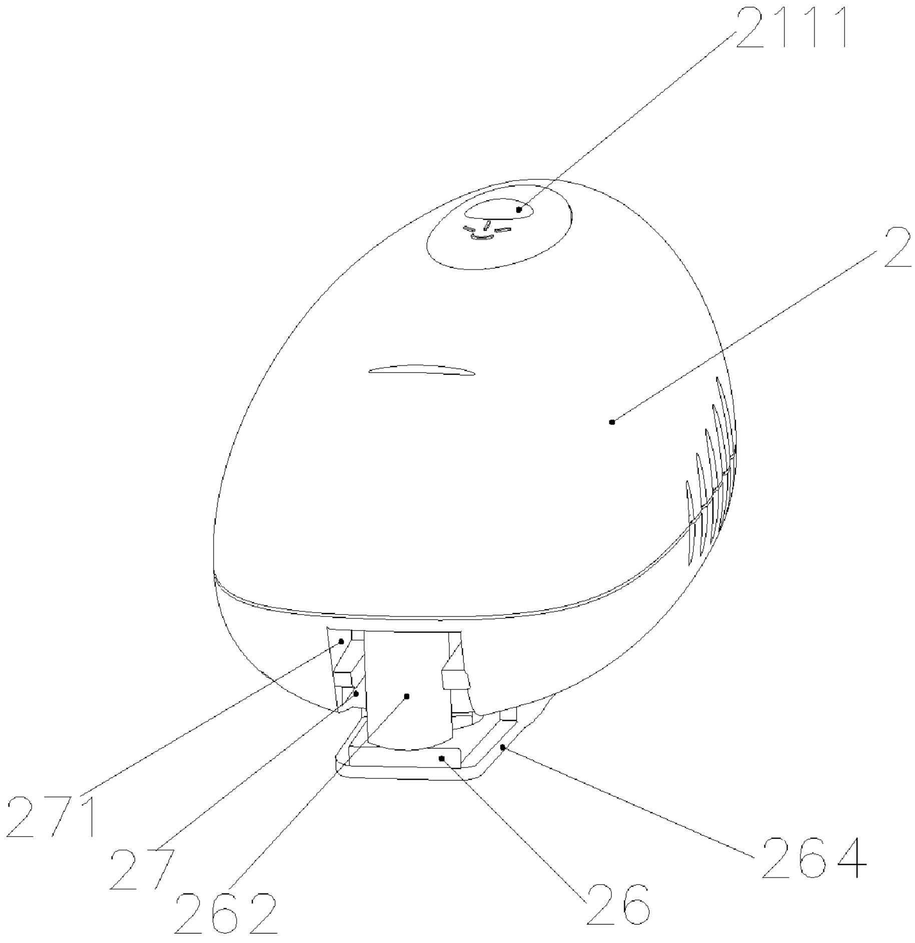
FIG. 7 is a third schematic view illustrating the structure of floodlight in the embodiment of this invention.

With reference to FIG. 1, a headlamp that can be disassembled comprises a fixture 1 with a head strap 11, and a floodlight 2. The floodlight 2 comprises a lamp body 21 and a lamp receptacle 22. In an embodiment of this invention, the head body 21 and lamp receptacle 22 of the floodlight 2 is an all-in-one unit integrally formed. The fixture mount 1 may be disassembled from the floodlight 2. In the described manner, the floodlight 2 can be taken apart from the fixture mount 1 to serve independently as an ordinary flashlight in daily life for a different application of the headlamp.

In the embodiment of this invention, a mounting plate 12 is connected with a turning joint to the fixture mount 1. The floodlight 2 may be dismantled and then inserted onto the mounting plate 12. Alternatively, the mounting plate 12 and the mounting plate 1 may also be integrally formed into an all-in-one unit, dispense with the requirement of turning joints. In this invention, the latter approach of integrally formed one unit is not adopted due to its less user-friendly limitation. The mounting plate 12 that is connected with the turning joint onto the fixture mount 1 is in a shape including a vertical portion and a horizontal portion. A lead groove 121 is formed at both sides of bottom lateral-side of the mounting plate 12. A lead rail 264 is formed on the lamp body 21 of the corresponding floodlight 2 to fix with a lead groove 121 at both sides of bottom lateral-side. A shift limit lug 122 is provided at a top of the bottom lateral-side of the mounting plate 12. A shift limit hole 263 is formed in a position where the shift limit lug 122 is corresponding to the lamp body 21 for fixing. The floodlight 2 that is thereby mounted onto the mounting plate 1 is much more firmly positioned on head. The mounting plate 12 may also be provided in another form, and once it is arranged in another form, the lamp body 21 corresponding to the floodlight 2 is differently connected. If the mounting plate 12 is, alternatively, arranged in a U shape, the mounting plate 12 clips the floodlight 2.

In the embodiment of this invention, a power generator 23, a rechargeable battery 24, and a gear transmission unit are provided in the lamp body 21 of floodlight 2. The gear transmission unit 25 is connected to a dynamo driving gear of the power generator 23. An output terminal of the power generator 23 is connected to the rechargeable battery 24. A rocking handle 26 that drives the gear transmission unit is provided on a housing 211 of the lamp body 21. The rocking handle 26 is provided at a bottom lateral-side of the housing 211 of the lamp body 21. A shaft 261 of the rocking handle 26 is arranged near a lateral-side of the lamp receptacle 22 of the housing 211. A receiving hole 27 for a handle portion 262 of the rocking handle 26 is formed near the bottom lateral-side of housing 211, and when the rocking handle 26 is not used, the handle portion 262 of the rocking handle 26 stays in the receiving hole 27. Thus, an electric power of the floodlight may be generated in situations of no battery or AC power supply.

In the embodiment of this invention, lead grooves 121 are provided at both sides of the handle portion 262 of the rocking handle 26 that serve as the lead rails 264 and at both sides of the bottom lateral-side of mounting plate 12. In the embodiment of this invention, alternatively, the lead rail 264 and the lead groove 121 may switch in position with each other, but the volume or space of the floodlight after being taken out must also be considered, thereby the latter approach of switching their respective position of the lead rail 264 and the lead groove 121 being not applied. The shift limit lug 122 with a T-shaped cross section is provided at the top of bottom lateral-side of the mounting plate 12, and the shift limit hole 263 correspondingly wedged to fix with the shift limit lug 122 is provided on the rocking handle 26 to prevent the floodlight 2 from falling transversally. The shift limit hole 263 comprises a center hole 2631 and an adjacent member 2632. The center hole 2631 is divided into a big-aperture part 26311 and a small-aperture part 26312, the inner side of big-aperture part 26311 communicates that of the small-aperture part 26312 through their corresponding curved faces 26313. The adjacent member 2632 is formed outside of the two curved faces 26313. The shift limit lug 122 is placed from the big-aperture part 26311 of center hole 2631 and glides to the small-aperture part 26312 to transversally and longitudinally wedge to and match with the shift limit hole 263; alternatively, the shift limit hole 263 is simply a hole, made with a material of flexibility.

Two insertion bars 123 are correspondingly provided at the side of mounting plate 12. A distance between the two insertion bars 123 is equal to a width of the handle portion 262 of the rocking handle 26. An insertion slot 271 is formed in the accommodation hole 27 for the handle portion 261 of the rocking handle near the bottom lateral-side of the housing 211 of the lamp body 21. The insertion bar 123 fixes with the insertion slot 271 for a further clamping of the lamp body 21 into the mounting plate 12. In the embodiment of this invention, the insertion bar 123 may be arranged on the lamp body 21 of floodlight and the insertion slot 271 may be arranged on the mounting plate 12.

In the embodiment of this invention, two supports 14 are provided on the fixture mount 1. The mounting plate 12 fixes with the fixture mount 1 through the support 14 with a turning joint, which is implemented through a gear matching with a hoodle. In the approach, it is easy to manually to turn round the floodlight 2, and the floodlight 2 is well secured after being turned round. The support 14 on the fixture mount may also be tightly compressed to revolve around the mounting plate 1 to fix with each other, which make sure that the floodlight 2 is secured after being turned round; the approach is commonly used in some fields, and thus is not described in details in this invention. Furthermore, the support on the fixture mount in the embodiment is made up with two parts, one for an all-in-one unit with the support and fixture mount 1, and the other for the part inserted from another side of the fixture mount 1 that lies in the mounting plate 12 and then secured with a screw for convenience of installation of the mounting plate 12 with the turning joint on the fixture mount. A button 211 is provided at a top side of the housing 211 to control the lamp receptacle. In the embodiment of this invention, a protruding stands 124 are provided near the angled portion of the mounting plate 12 and at a side of the shift limit lug 122, and through the protruding stand 124, internal matching parts are more closely fixed with each other after the floodlight 2 is inserted. If the connected parts cooperate well, the protruding stand 124 is not needed.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A headlamp, comprising a fixture mount with a head strap, and a floodlight, removably mounted to the fixture mount, comprising a lamp body and a lamp receptacle that are combined into one unit, wherein a power generator, a rechargeable battery, and a gear transmission unit are provided in the lamp body of floodlight, the gear transmission unit is connected to a dynamo driving gear of the power generator, an output terminal of the power generator is connected to the rechargeable battery, and a rocking handle that drives the gear transmission unit is provided on a housing of the lamp body, the rocking handle is provided at a bottom lateral-side of the housing of the lamp body, a shaft of the rocking handle is positioned near a lateral-side of the lamp receptacle of the housing, a receiving hole for a handle portion of the rocking handle is formed near the bottom lateral-side of housing, and when the rocking handle is not used, the handle portion of the rocking handle stays in the receiving hole, and lead grooves are provided at an end of the handle having the handle portion, a shift limit lug with a T-shaped cross section is provided on a top surface of the bottom lateral-side of the mounting plate, and a shift limit hole correspondingly wedged to fix with the shift limit lug is provided on the rocking handle.

2. The headlamp according to claim 1, wherein the shift limit hole comprises a center hole and an adjacent member, the center hole is divided into a big-aperture part and a small-aperture part, an inner side of big-aperture part communicates that of the small aperture part through their corresponding curved faces, the adjacent member is formed outside of the curved faces, and the shift limit lug is placed from the big-aperture part of the center hole and glides to the small-aperture part for transversally and longitudinally fixing with the shift limit hole.

3. The headlamp according to claim 2, wherein two insertion bars are correspondingly provided at a side of the mounting plate, a distance between the two insertion bars is equal to a width of the handle portion of the rocking handle, an insertion slot is formed in the receiving hole.

4. The headlamp according to claim 3, wherein two supports are provided on the fixture mount, the mounting plate fixes with the fixture through the support with a turning joint, a protruding stand is provided near an angled portion of the mounting plate of a shape including a horizontal portion and a vertical portion, and a button is provided at a top side of the housing to control the lamp receptacle.

5. The headlamp according to claim 2, wherein two supports are provided on the fixture mount, the mounting plate matches with the fixture through the support with a turning joint, a protruding stand is provided near an angled portion of the mounting plate of a shape including a horizontal portion and a vertical portion, and at a side of the shift limit lug, and a button is provided at a top side of the housing to control the lamp receptacle.

* * * * *